(12) United States Patent
Hahner

(10) Patent No.: US 9,121,436 B2
(45) Date of Patent: Sep. 1, 2015

(54) CENTERING DEVICE

(71) Applicant: Bernhard Hahner, Petersberg-Bockels (DE)

(72) Inventor: Bernhard Hahner, Petersberg-Bockels (DE)

( * ) Notice: Subject to any disclaimer, the term of this patent is extended or adjusted under 35 U.S.C. 154(b) by 0 days.

(21) Appl. No.: 14/404,318

(22) PCT Filed: May 29, 2013

(86) PCT No.: PCT/IB2013/001076
§ 371 (c)(1),
(2) Date: Nov. 26, 2014

(87) PCT Pub. No.: WO2013/179119
PCT Pub. Date: Dec. 5, 2013

(65) Prior Publication Data
US 2015/0110577 A1 Apr. 23, 2015

(30) Foreign Application Priority Data
Jun. 1, 2012 (DE) .......................... 10 2012 010 804

(51) Int. Cl.
*F16B 43/02* (2006.01)
*F16B 43/00* (2006.01)
*F16B 5/02* (2006.01)

(52) U.S. Cl.
CPC ................ *F16B 43/00* (2013.01); *F16B 5/025* (2013.01); *F16B 5/0225* (2013.01); *F16B 43/002* (2013.01)

(58) Field of Classification Search
CPC .............. F16B 2/02; F16B 5/02; F16B 5/025; F16B 5/0225; F16B 5/06; F16B 37/04; F16B 37/043; F16B 43/00; F16B 43/002; F16B 43/003; B65G 21/00; B65G 41/00; B65G 41/006
USPC ............ 411/136, 539, 548; 52/235; 248/74.1
See application file for complete search history.

(56) References Cited

U.S. PATENT DOCUMENTS

| | | | |
|---|---|---|---|
| 6,732,982 B1 * | 5/2004 | Messinger | 248/74.1 |
| 7,857,565 B2 * | 12/2010 | Martinson | 411/136 |
| 8,434,986 B2 * | 5/2013 | Tang | 411/535 |
| 8,910,449 B2 * | 12/2014 | Burke et al. | 52/707 |
| 2013/0061453 A1 * | 3/2013 | Rosendahl | 29/525.11 |
| 2014/0157699 A1 * | 6/2014 | Moeller et al. | 52/235 |

FOREIGN PATENT DOCUMENTS

| | | |
|---|---|---|
| DE | 10159380 | 6/2003 |
| DE | 10033011 | 6/2005 |

* cited by examiner

*Primary Examiner* — Roberta Delisle
(74) *Attorney, Agent, or Firm* — Notaro, Michalos & Zaccaria P.C.

(57) ABSTRACT

A centering device for mounting a flange with a bolt passing through a opening in a mounted state, has a centering disk with a collar surrounding a disk part. The disk part is received in the opening and the collar rests on the flange. An elongated hole in the disk part has, at its respective ends, semicircles of radii R and a straight piece connecting the semicircles of overall length L1. A centering sleeve has a sleeve part surrounded by a sleeve collar wherein the inside diameter D3 of the sleeve part corresponds to the diameter of the bolt and the outside diameter D2 of the sleeve part corresponds to the transverse diameter (2R) of the elongated hole. A locking device fixes the centering sleeve against the centering disk in a predetermined mounting position secure against displacement.

5 Claims, 3 Drawing Sheets

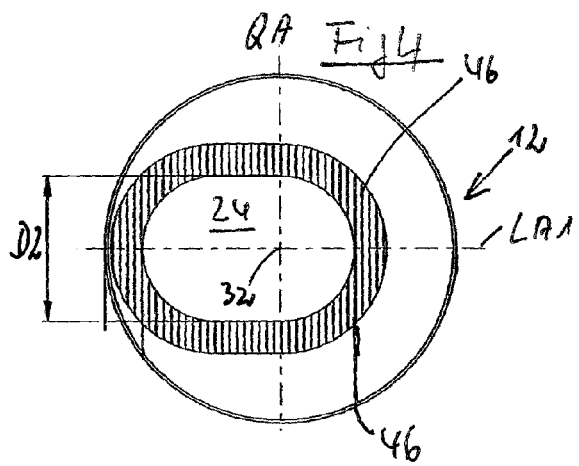
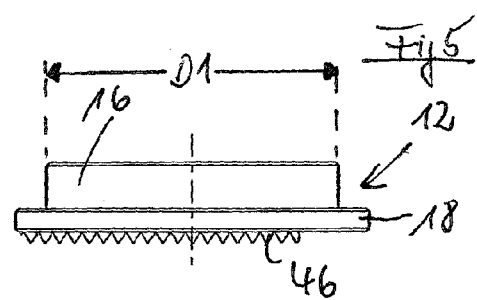
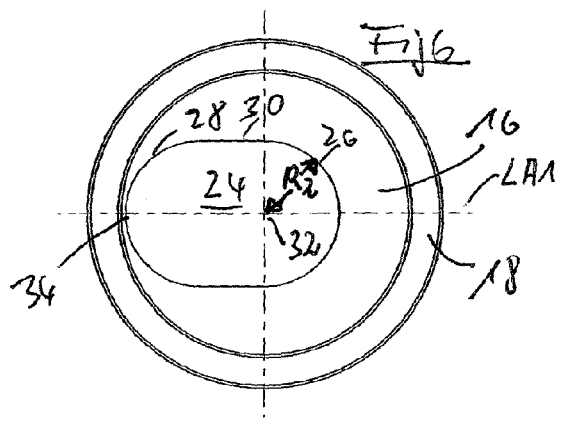
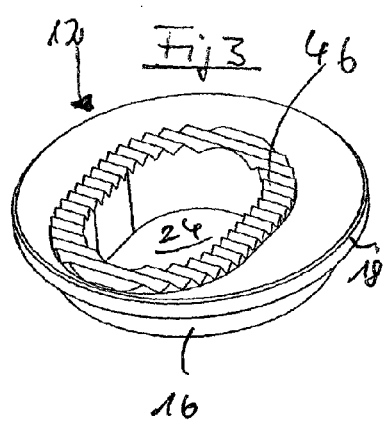

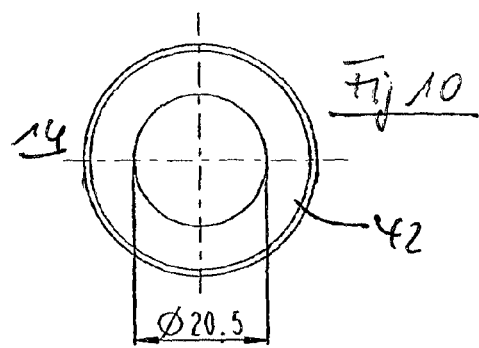
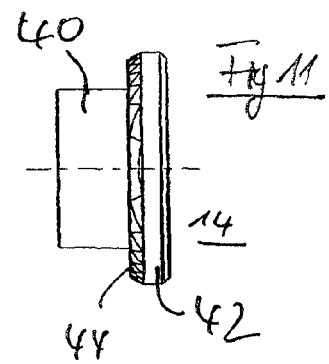
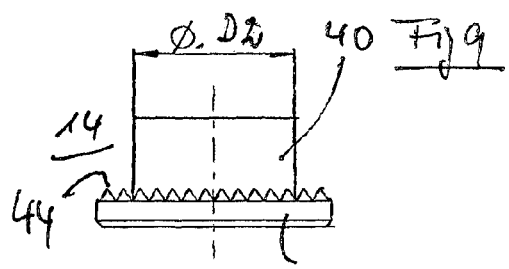
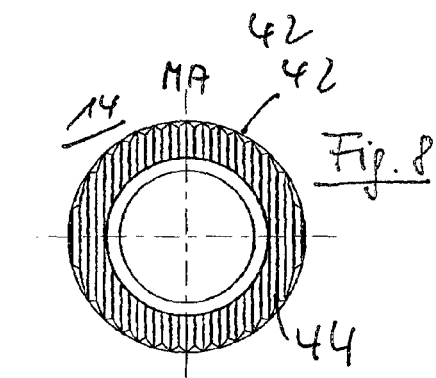
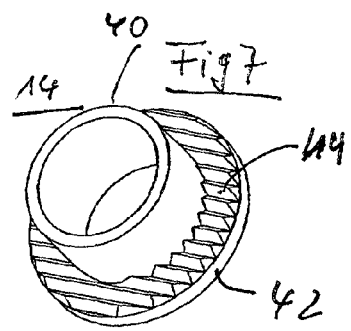

CENTERING DEVICE

The invention relates to a centering device for mounting a flange provided with an opening with a bolt which passes through the opening in the mounted state according to the preamble of claim 1.

In steel construction, halls are usually constructed with steel supports which in the floor region are fastened with flanges (foot plates) to steel bolts anchored in the ground. In order to guarantee an exact design, the bolts must be aligned exactly both with regard to the flange itself and also in alignment from support to support. Therefore a precisely tailored anchoring of the bolts, usually threaded bolts with heavy-duty dowels, in the foundation of the hall is required, which in some cases can lead to centering problems with a misalignment of the bolts in the cast concrete. Expensive centering work must then be executed, for example, by re-anchoring and alignment of the bolts in the already-hardened concrete floor which causes a prising open of the floor and therefore appreciable costs for re-alignment.

The same applies in the case of a misalignment of the posts amongst one another if these are not aligned in exact alignment. Even then the individual bolts anchored in the ground must be re-aligned. In some cases however, a re-orientation of the drill is no longer possible so that the flanges must be reworked in a corresponding manner, for example the flanges must be exchanged with correspondingly aligned drilling and must be re-welded onto the steel support.

It would therefore be advantageous to provide an adjusting or centering device which can eliminate these problems rapidly and simply.

A generic centering device is known from DE 100 33 011 A1. This shows a centering device with longitudinally displaceable claws which can be fixed with bolts onto the flanges of a fixed T-beam. The known bolts are adjustable in their position prior to mounting and are not fixed in the ground.

Another centering device is known from DE 101 59 380 A1 which comprises a nut part and a fastening part with snap action hooks for fixing a component comprising a bolt. The fastening is accomplished here primarily via the snap action hooks in the pre-fabricated receiving bores of the nut part whilst the bolt only has a securing function for the two components.

Known from each of FR 2744501A1 and WO 2010/006363A1 is a centering device according to the preamble of claim 1 which comprises a centering disk with an elongate hole and a centering plate, where a saw-tooth-shaped locking device is provided between centering disk and centering plate. The centering plate itself has an opening passing through it, which comes into alignment with the centering plate in the mounted state so that a fixing screw can be guided through the two openings. A disadvantage with these centering arrangements is the only slight lateral guidance for the bolt part of the screw in the two openings so that lateral twistings or displacements of the screw can occur in the mounted state.

It is therefore the object of the invention to provide a centering device of the type mentioned initially with which flanges can be aligned with incorrectly fixed bolts in a tailor-made manner and can be fixed laterally stably.

The solution according to the invention is achieved with the features according to the characterizing part of claim 1.

The centering device according to the invention for mounting a flange provided with an opening with a bolt initially has the feature that the diameter of the bolt is substantially smaller than the diameter of the opening provided in the flange which receives the bolt in the mounted state. Thus, the diameter of the opening can preferably be up to a factor of 3-4 larger than the bolt diameter.

For fastening the bolt, the flange opening receives a preferably round disk over its full circumference which is provided with a circumferential collar which can also be present in partial regions. The disk can be turned inside the likewise round opening if necessary for mounting purposes until the desired position is reached. In order to prevent the disk falling through the opening, the collar is provided which during mounting in the opening rests on the flange and effectively receives compressive forces which occur during mounting.

In order to improve the locking of the disk in the flange opening, the part of the disk disposed in the flange opening in the mounted state can advantageously be provided with a notched toothed structure. By this means a frictional locking is achieved in the fixed state which further promotes the locking of the disk. This notched toothed structure can be formed on the outer sleeve of the sleeve-shaped disk so that it expands conically towards the collar.

The disk according to the invention has an elongate hole which passes through the bolt in the mounted state. The elongate hole is formed so that at both ends it has a semicircle having a radius $r$ and a straight piece connecting the two semicircles having the length $l$ and the diameter $2r$. The overall length of the elongate hole is therefore $l+2r$. In this case, the longitudinal axis of the elongate hole advantageously coincides with the central axis of the disk running through the central point of the disk.

Advantageously the central point of one semicircle of the elongate hole lies in or directly adjacent to the central point of the disk whilst the apex of the second semicircle is disposed adjacent to the disk edge. It is thereby ensured that an alignment of the bolt can be accomplished starting from the central point of the disk as far as the disk edge, i.e. the flange can be displaced up to twice the bolt diameter or more for alignment purposes.

A further feature of the invention is the locking of the bolt relative to the disk. A cylindrical sleeve whose inside diameter corresponds to the diameter of the bolt is used for this purpose so that the bolt in the mounted state is guided in an exactly fitting manner in the cylindrical sleeve. On the other hand, the outside diameter of the sleeve corresponds to the transverse diameter $2r$ of the elongate hole so that the sleeve can be displaced in a precisely fitting manner inside the elongate hole together with the bolt.

The sleeve furthermore has a sleeve collar at its upper end, which rests on the disk in the mounted state and is supported by the disk. The sleeve collar can be configured in an identical manner to the collar of the disk, i.e. it can be interrupted in partial regions or however not completely surround the sleeve.

In order to prevent a displacement of the sleeve which comprises the bolt, in the mounted state, a locking device is provided between the sleeve collar and the disk, which after reaching a predetermined mounting position fixes the sleeve against the disk secure against displacement, in particular when the entire centering device is fixed with the aid of a nut screwed onto the bolt. If a rivet or the like is used instead of a threaded bolt, the fixing is accomplished by appropriate treatment of the rivet with forming measures or the like.

In order to ensure a locking which is secure against displacement, preferably at least one tooth-like elevation is provided on the underside of the sleeve collar, whose longitudinal axis runs parallel to the central axis running through the sleeve. According to a further embodiment, a plurality of such first tooth-like elevations are provided on the underside of the sleeve collar which are disposed parallel to one another at a predetermined equal spacing of the teeth. The first tooth-like elevation on the sleeve collar engages in a second tooth-like arrangement consisting of two parallel teeth on the disk. These second tooth-like elevations each extend away from the elongate hole in such a manner that the longitudinal axis of the second tooth-like elevation runs parallel to the transverse axis of the elongate hole.

As a result of the parallel alignment of first and second tooth-like elevations, the two tooth structures can intermesh substantially congruently in the mounted state and thus prevent a displacement of the sleeve relative to the disk. At the same time, the respective spacing of the teeth affords the possibility of positioning by displacement of sleeve and disk in the elongate hole. This can be accomplished in sections of 2-3 mm in each case.

Preferably the following tooth pairings are possible:
a) a first tooth-like elevation on the sleeve and at least two tooth-like elevations, preferably a plurality of tooth-like elevations around the elongate hole;
b) a second tooth-like elevation in the region of the elongate hole and at least two tooth-like elevations on the sleeve edge, preferably a plurality of tooth-like elevations around the sleeve edge, as well as
c) a plurality of first and second tooth-like elevations in each case on the sleeve edge and on the disk.

According to a further advantageous embodiment, punctuate elevations, for example, pimples and matching punctuate recesses similarly to the tooth-like elevations and the recesses hereof are used as locking device. In this case, holes or series of holes into which the pimples fit positively during mounting are suggested as punctuate recesses.

A further advantageous embodiment provides a second locking device against radial twisting of the centering disk in the opening of the flange after mounting. Rows of teeth running parallel to the central axis, disposed on the circumference of the disk part can be used as locking means which engage in correspondingly configured rows of teeth in the wall of the flange bore. During mounting of this embodiment, the centering disk is initially turned into the matched mounting position above the flange tooth by tooth and then lowered into the bore where the teeth of the disk part and the bore wall interlock in a manner secure against rotation.

Tradable parts are preferably the sleeve having a predetermined inside diameter which corresponds to the diameter of the bolts used in steel construction, for example, M18-M30 etc. Furthermore this includes the disk matched to the sleeve having a diameter which corresponds to the diameter of a pre-fabricated flange opening where the disk has the elongate hole according to the invention which receives the sleeve in a precisely tailored manner.

Both the disk and also the sleeves which each comprise a part of the locking device according to the invention are preferably fabricated from the material as used in steel construction, for example, of steel or stainless steel.

The dimensioning of the disk and sleeve according to the invention corresponds to the intended usage and the usual standards. For the mounting of a flange which is fastened to steel components such as supports or the like, the flange is aligned in the predetermined manner where the bolts pass through the openings in the flange. In the mounted state a deviation of the central mounted state by up to 3 cm can be compensated with the device according to the invention. To this end, the disk is inserted into the bolt and then the flanges are introduced into the opening where the disk is then turned until it is located in the opening and the edge rests on the flange region surrounding the opening. The sleeve is then pushed onto the bolt and inserted into the elongate hole opening by appropriate turning of the disk until accuracy of fit is achieved. The sleeve edge is then turned until the first and second tooth-like elevations intermesh and the sleeve is thereby fixed against the disk. This fixing state gives a fixing in the longitudinal and transverse direction of the bolt so that after fixing the bolt by means of a screw-nut which is screwed against the sleeve, a lateral displacement of the flange is no longer possible.

Further features and advantages of the invention are the subject matter of the following description and the diagrammatic representation of exemplary embodiments.

Figure 12:
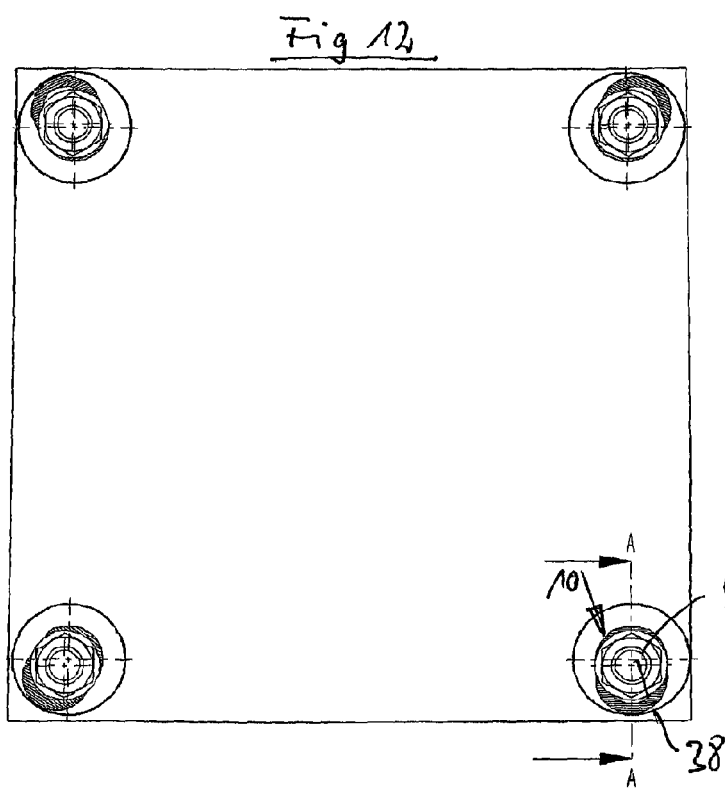
Figure 13:
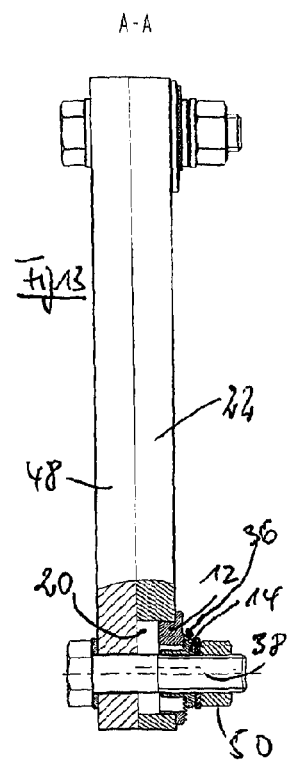

FIG. 3 shows a centering disk with collar and tooth-like elevations seen perspectively from above, FIG. 4 shows a plan view of the centering disk according to FIG. 3, FIG. 5 shows a side view of the centering disk, FIG. 6 shows a view of the lower part of the centering disk, FIG. 7 shows a perspective view of the centering sleeve viewed from obliquely below, FIG. 8 shows a view of the centering sleeve from below, FIG. 9 shows a side view of the centering sleeve, FIG. 10 shows a plan view of the centering sleeve, FIG. 11 shows a second side view of the centering sleeve which is turned through 90° with respect to the side view according to FIG. 9, FIG. 12 shows a plan view of the flange with the device according to the invention in the mounting position and FIG. 13 shows a side view of the flange according to FIG. 12, where a centering device according to the line B-B is shown in section.

Figure 2:
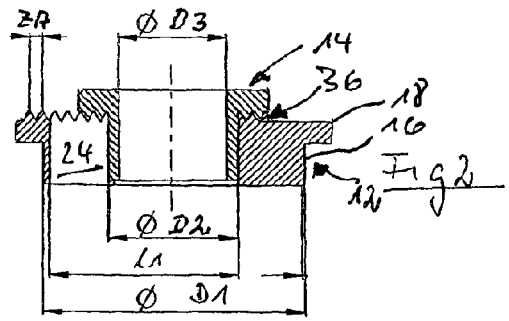
FIG. 2 shows a section through the centering device according to FIG. 1 along the line A-A turned through 180°
Figure 1:
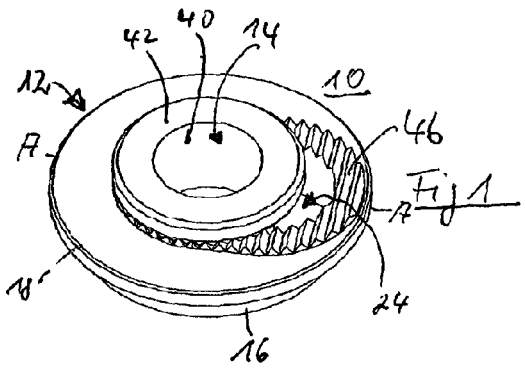
FIG. 1 shows a perspective view of a centering device.

FIG. 1 shows a centering device 10 with a centering disk 12 and a centering sleeve 14 in perspective view and in FIG. 2 in section along the line A-A.

The centering disk 12 is shown in detail in FIGS. 1-6 and the centering sleeve is shown in detail in FIGS. 7-11.

The centering disk 12 comprises a disk part 16 having a diameter D1. The disk part 16 itself is surrounded at its upper end by a first collar 18 whose diameter is greater than the diameter D1.

As can be seen from FIGS. 1-6, the disk part 16 comprises a substantially circular shape in order to be received in an opening 20 of a flange 22 as can be seen from FIG. 13. In this case, the collar 18 rests on the flange surface.

The diameter D1 of the disk part 16 approximately corresponds to the diameter of the opening 20 of the flange 22 so that the disk part 16 can be turned through any arbitrary angle during insertion into the opening 20.

The disk part 16 has an elongate hole 24 which is configured in such a manner that at both ends it has a semicircle 26 and 28 having a radius R, where the two semicircles 26 and 28 are connected to one another by a straight piece 30. This elongate hole 24 has an overall length L1 as shown in FIG. 2. As is apparent in particular from FIGS. 4 and 6, the longitudinal axis L A1 of the elongate hole 24 coincides with the central axis leading through the central point of the disk part 16.

In this case, the central point 32 of one semicircle 26 of the elongate hole 24 lies approximately at the central point 32 of the disk part 16, where the apex 34 of the second semicircle 28 is disposed adjacent to the edge of the disk part 16. This elongate hole 24 is penetrated by a bolt 38 shown in FIGS. 12 and 13 during mounting and is configured so that the bolt can be displaced along the entire length L1 inside the elongate hole 24. In consequence, as a result of the possibility of displacement a wide adjustability of the bolt 38 from the disk central point as far as the disk edge is possible, for example, up to twice the diameter of the bolt 38 or even beyond.

The bolt 38 itself is held in the centering sleeve 14 as can be seen from FIG. 13. As shown in FIGS. 7-11, the centering sleeve 14 has a sleeve part 40 which is connected at one end to a circumferential sleeve collar 42. The outside diameter D2 of the sleeve in this case corresponds to the transverse diameter of the elongate hole, i.e. 2×R as can be seen from FIG. 9 in conjunction with FIG. 6. Consequently the sleeve part 40 fits exactly into the elongate hole 26. On the other hand, the sleeve part 40 has an inside diameter D3 which corresponds to the diameter of the bolt 38 so that the bolt 38 is received exactly in the sleeve part 40 during mounting.

As can be seen from FIGS. 1 and 2 the sleeve collar 42 rests on the side edges of the elongate hole 24 and is supported in the mounted state on the centering disk 12.

In order to prevent a displacement of the centering sleeve 14 with respect to the centering disk 12, a locking device 36 is provided between these parts as can be seen from FIG. 2 and FIG. 13. The locking device 36 consists on the side of the centering sleeve 14 of first tooth-like elevations 44 which are disposed on the underside of the sleeve collar 42. The longitudinal axis of the tooth-like elevations 44 runs parallel to the central axis MA of the centering disk as can be seen from FIG. 8. A plurality of such tooth-like elevations 44 is provided below the sleeve collar 42, in each case parallel to one another, where the individual teeth are located at a regular spacing ZA (cf. FIG. 2). This spacing ZA gives the possibility of displacement of the centering sleeve 14 on the centering disk 20 in a stepwise manner.

The counterpiece to the first tooth-like elevations 44 on the centering sleeve 12 are the second tooth-like elevations 46 around the elongate hole 24. In this case, the longitudinal axis (FIG. 4) of the tooth-like elevations 46 runs parallel to the transverse axis QA of the elongate hole, where a plurality of tooth-like elevations 46 arranged parallel to one another are grouped around the elongate hole 24. The spacing of the individual teeth 46 is in this case identical to the spacing ZA of the tooth-like elevations 44 so that the two tooth-like elevations 44 and 46 intermesh when placing the centering disks 12 and the centering sleeve 14 one upon the other. Consequently the tooth-like elevations 44 and 46 form the locking device 36 in such a manner that the centering sleeve 14 on the centering disk 12 can be offset by steps which correspond to the spacing ZA of the respective teeth with respect to one another.

For mounting purposes the flange 22 has a bore or opening 20 into which the disk part 16 of the centering disk 12 is inserted. In this case, the diameter of the opening 20 can be up to three times the diameter of the bolt 38. Previously a bolt 38 which in the exemplary case according to FIG. 12 and FIG. 13 had been fastened on a second flange plate, had been guided through the opening 20. It can be seen from FIG. 12 that the bolt 38 is not located centrally in the opening in each case so that the use of the centering device 10 is necessary. For this purpose the centering disk 12 is turned in the opening 20 until the bolt 38 is at approximately the same distance from the side wall of the elongate hole 24. The centering sleeve 14 is then inserted into the bolt 30 and comes to rest on the centering disk 12. A renewed turning, now of the centering sleeve 14 is initiated until the tooth-like elevations 44 of the centering sleeve 14 intermesh with the tooth-like elevations 48 of the centering disk 12 and thus a displacement of the entire centering device 10 inside the flange 26 both in the radial direction and in the direction of the longitudinal axis of the elongate hole 24 is no longer possible. The fixing of the centering device 10 on the flange 22 is then accomplished by means of a nut 50 with which the bolt 38 fixes the two flanges 22 and 48 to one another.

With the centering device 10 it is thereby possible to stably centre eccentrically disposed bolts 38 in an opening and specifically to produce a straight line both with regard to further fastening units (bolts) inside a flange and also between different flanges spaced apart from one another.

The invention claimed is:

1. Centering device for mounting a flange provided with an opening with a bolt which passes through the opening in the mounted state, comprising
    a) a centering disk having a disk part and a collar surrounding the disk part, wherein the disk part is received in the opening in the mounted state and the collar rests on the flange,
    b) an elongate hole in the disk part, wherein the elongate hole has at the respective ends a semicircle having a radius R and a straight piece connecting the two semicircles and has an overall length L1,
    c) a centering piece and
    d) a locking device which fixes the centering piece against the centering disk in a predetermined mounting position secure against displacement,
    wherein
    e) the centering piece comprises a centering sleeve with a sleeve part which is surrounded by a sleeve collar, wherein the inside diameter D3 of the sleeve part corresponds to the diameter of the bolt and the outside diameter D2 of the sleeve part corresponds to the transverse diameter (2R) of the elongate hole.

2. The centering arrangement according to claim 1, wherein the lower side of the sleeve collar comprises at least a first tooth elevation as a part of the locking device, whose longitudinal axis runs parallel to the central axis MA of the centering sleeve or coincides with this.

3. The centering arrangement according to claim 2, wherein at least two, preferably a plurality of first tooth elevations arranged parallel to one another on the underside of the sleeve collar.

4. The centering arrangement according to claim 2, wherein at least two, preferably a plurality of second elevations disposed at the same tooth spacing ZA from one another and parallel to one another along the elongate hole, wherein the first and second tooth elevations and intermesh in the mounted state as a result of the same tooth spacing ZA and lock the centering sleeve and the centering disk.

5. The centering arrangement according to claim 1, wherein the upper side of the disk part has at least one second tooth elevation as another part of the locking device, wherein the longitudinal axis of the second tooth elevation runs parallel to the transverse axis QA of the elongate hole and the second tooth elevation is in each case disposed laterally of the elongate hole.

* * * * *